United States Patent
Yoshida et al.

(10) Patent No.: US 11,585,474 B2
(45) Date of Patent: Feb. 21, 2023

(54) PIPE JOINT

(71) Applicant: Hitachi Metals, Ltd., Tokyo (JP)

(72) Inventors: Yoshinori Yoshida, Tokyo (JP); Masahiro Mori, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 155 days.

(21) Appl. No.: 16/651,382

(22) PCT Filed: Sep. 26, 2018

(86) PCT No.: PCT/JP2018/035747
§ 371 (c)(1),
(2) Date: Mar. 27, 2020

(87) PCT Pub. No.: WO2019/065762
PCT Pub. Date: Apr. 4, 2019

(65) Prior Publication Data
US 2020/0263816 A1    Aug. 20, 2020

(30) Foreign Application Priority Data

Sep. 29, 2017  (JP) .............................. JP2017-189342

(51) Int. Cl.
*F16L 25/01*    (2006.01)
*F16L 25/00*    (2006.01)

(52) U.S. Cl.
CPC ........... *F16L 25/01* (2013.01); *F16L 25/0036* (2013.01)

(58) Field of Classification Search
CPC ... F16L 25/01; F16L 25/0036; F16L 25/0063; F16L 25/0054; F16L 11/15; F16L 11/11;
(Continued)

(56) References Cited

U.S. PATENT DOCUMENTS

| 4,630,850 A | * | 12/1986 | Saka | .................. F16L 25/0036 |
| | | | | 285/903 |
| 4,907,830 A | * | 3/1990 | Sasa | ............................. 285/903 |

(Continued)

FOREIGN PATENT DOCUMENTS

| CN | 104169625 A | 11/2014 |
| JP | 10-257636 A | 9/1998 |

(Continued)

OTHER PUBLICATIONS

First Office Action dated Mar. 31, 2021, of counterpart Chinese Application No. 201880063304.9, along with an English translation.

*Primary Examiner* — Zachary T Dragicevich
*Assistant Examiner* — William S. Choi
(74) *Attorney, Agent, or Firm* — DLA Piper LLP (US)

(57) ABSTRACT

A pipe joint connecting a first pipe having conductivity and being grounded and a second pipe including a corrugated metallic pipe member and a conductive layer having lower electric resistance than metal forming the pipe member and covering the pipe member, the pipe joint including a connection part that has conductivity and is connected to the first pipe, a housing part that has conductivity, is engaged with the connection part, and houses the second pipe inside the housing part by insertion of the second pipe along an axis direction of the second pipe, and a conductive member that includes a first part in contact at least partially with the housing part and a second part exposed to an outside of the housing part to be in contact with the conductive layer.

2 Claims, 7 Drawing Sheets

(58) Field of Classification Search
CPC ....... F16L 19/0206; F16L 19/065; F16L 9/06;
F16L 33/26; F16L 33/32; F16L 27/0857;
F16L 51/02; F16L 19/0212
USPC ............ 285/425, 903, 226, 227, 299, 145.5,
285/151.1
See application file for complete search history.

(56) References Cited

U.S. PATENT DOCUMENTS

| | | | | |
|---|---|---|---|---|
| 6,173,995 | B1* | 1/2001 | Mau | F16L 25/0036 |
| | | | | 285/903 |
| 7,690,695 | B2* | 4/2010 | Duquette | F16L 25/0036 |
| | | | | 285/903 |
| 8,490,513 | B2* | 7/2013 | Chiou | 285/151.1 |
| 2005/0023832 | A1* | 2/2005 | Edler | F16L 25/0036 |
| | | | | 285/903 |
| 2005/0093294 | A1* | 5/2005 | Anselmo | 285/903 |
| 2010/0209178 | A1* | 8/2010 | Oh | F16L 25/0036 |
| 2013/0087381 | A1 | 4/2013 | Daughtry et al. | |
| 2014/0145434 | A1 | 5/2014 | Oh | |
| 2014/0333066 | A1 | 11/2014 | Strunk | |
| 2016/0123506 | A1 | 5/2016 | Strunk | |

FOREIGN PATENT DOCUMENTS

| | | |
|---|---|---|
| JP | 2008-256108 A | 10/2008 |
| WO | 2013/018542 A1 | 2/2013 |

* cited by examiner

PIPE JOINT

TECHNICAL FIELD

This disclosure relates to a pipe joint.

BACKGROUND

Some pipe joints are used to connect a corrugated pipe including a corrugated metallic pipe member and a conductive layer having lower electric resistance than metal forming the pipe member and covering the pipe member, to another pipe. The conductive layer needs to be grounded to prevent damages of a tubing member in a corrugated pipe due to transmission of a large current occurred by induction lightning. As the form of grounding, the conductive layer may be electrically connected to a preliminarily grounded pipe through a pipe joint.

The pipe joint in US patent application Laid-open No. 2014-0333066 secures a ground path of the conductive layer by bringing the conductive layer in a corrugated pipe into an inner portion of the pipe joint in the state where the pipe joint is connected to the corrugated pipe. However, in the pipe joint in US '066, the contact portion between the conductive layer and the pipe joint is inside the pipe joint in the state where the corrugated pipe is connected to the pipe joint, which causes a problem that it is not possible to confirm from the outside whether the conductive layer is actually in contact with the pipe joint. Moreover, the inside of the pipe joint has more limited space than the outside thereof. Thus, it is difficult to sufficiently secure a contact area between the conductive layer and the pipe joint, which causes a problem that it is not easy to let a large current flow from the conductive layer to the pipe joint. There has thus been a demand for the technology allowing both the confirmation from the outside whether the conductive layer is in contact with the pipe joint, and the easy flow of a large current from the conductive layer to the pipe joint.

SUMMARY

We thus provide:

(1) A pipe joint connects a first pipe having conductivity and being grounded and a second pipe including a corrugated metallic pipe member and a conductive layer having lower electric resistance than metal forming the pipe member and covering the pipe member. The pipe joint comprises: a connection part that has conductivity and is connected to the first pipe; a housing part that has conductivity, is engaged with the connection part, and houses the second pipe inside the housing part by insertion of the second pipe along an axis direction of the second pipe; and a conductive member that includes a first part in contact at least partially with the housing part and a second part exposed to an outside of the housing part to be in contact with the conductive layer. The pipe joint is in contact with the conductive layer of the corrugated pipe as the second pipe by the second part exposed to the outside. Thus, it is possible to confirm from the outside whether the conductive layer is in contact with the pipe joint after the second pipe is connected to the pipe joint. Moreover, the conductive layer is in contact with the pipe joint on the outside of the pipe joint. Thus, as compared with the form in which the conductive layer is in contact with the pipe joint on the inside of the pipe joint, it is possible to more easily secure a contact area between the conductive layer and the pipe joint, which allows a large current to flow more easily from the conductive layer to the pipe joint.

(2) The second part may include a projection projecting toward the conductive layer. It is possible to more easily secure a contact area between the second part and the conductive layer.

(3) The conductive member may further includes a third part engaged with an outer edge of the second pipe housed in the housing part. The first part may include a surface facing at least one side of the axis direction. The housing part may be engaged with the connection part from the one side and fixes the second pipe via the conductive member, in a state that the third part is engaged with the outer edge of the second pipe. The housing part is engaged with the connection part in the state where the housing part presses the surface of the first part facing the insertion direction toward the opposite direction of the insertion direction, which makes it difficult to deteriorate the contact between the housing part and the conductive member.

Figure 1:
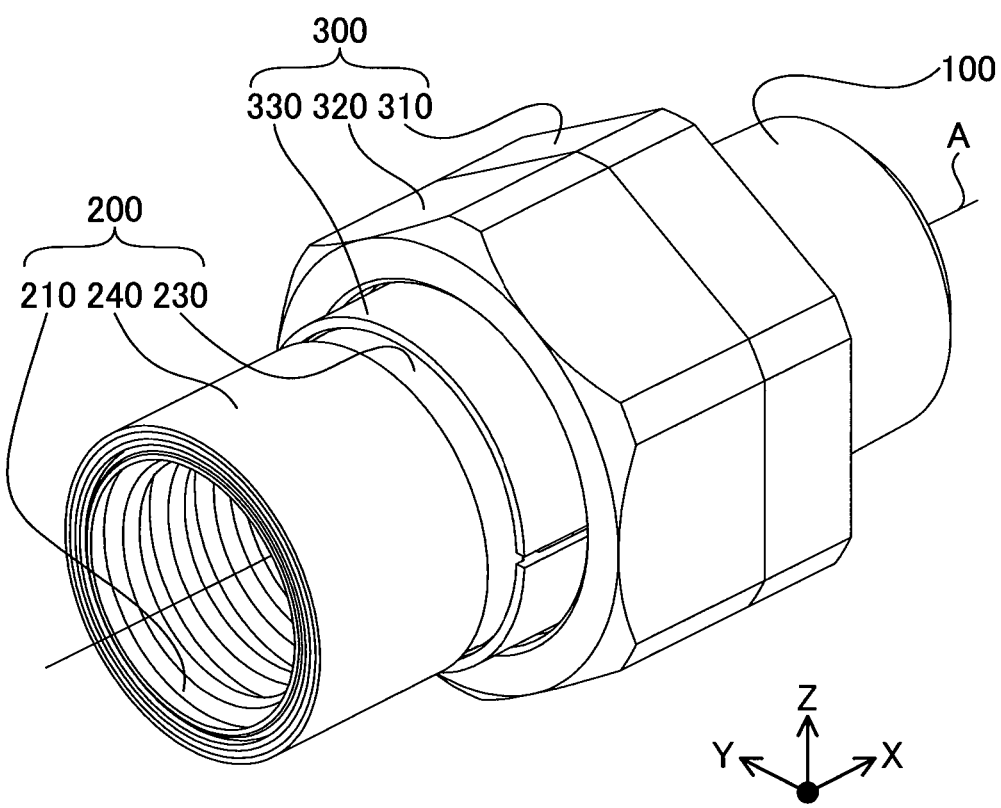
FIG. 1 is a perspective view illustrating a configuration of a pipe joint according to a first example.

REFERENCE SIGNS LIST 100 first pipe
200 second pipe
210 pipe member
220 resin layer
230 conductive layer
240 resin layer
300 pipe joint
310 connection part
315 sealing member
320 housing part
330 conductive member
331 first part
332 second part
333 third part
A axis line
C1 contact point
C2 contact point
L distance
P projection
S1, S2 surface
F female screw
M male screw

DETAILED DESCRIPTION

A. First Example

A1. Device Configuration:
FIG. 1 is a perspective view illustrating a configuration of a pipe joint 300 according to a first examples. In FIG. 1, the pipe joint 300 connects a first pipe 100 and a second pipe 200. FIG. 1 illustrates XYZ axes orthogonal to one another. The X axis in FIG. 1 is set to be parallel to an axis line A of the first pipe 100 and the second pipe 200 connected by the pipe joint 300. The XYZ axes in FIG. 1 correspond to XYZ axes in the other drawings. Note that for convenience, FIG. 1 illustrates only a part along the X-axis direction of the first pipe 100 and the second pipe 200.

Figure 2:
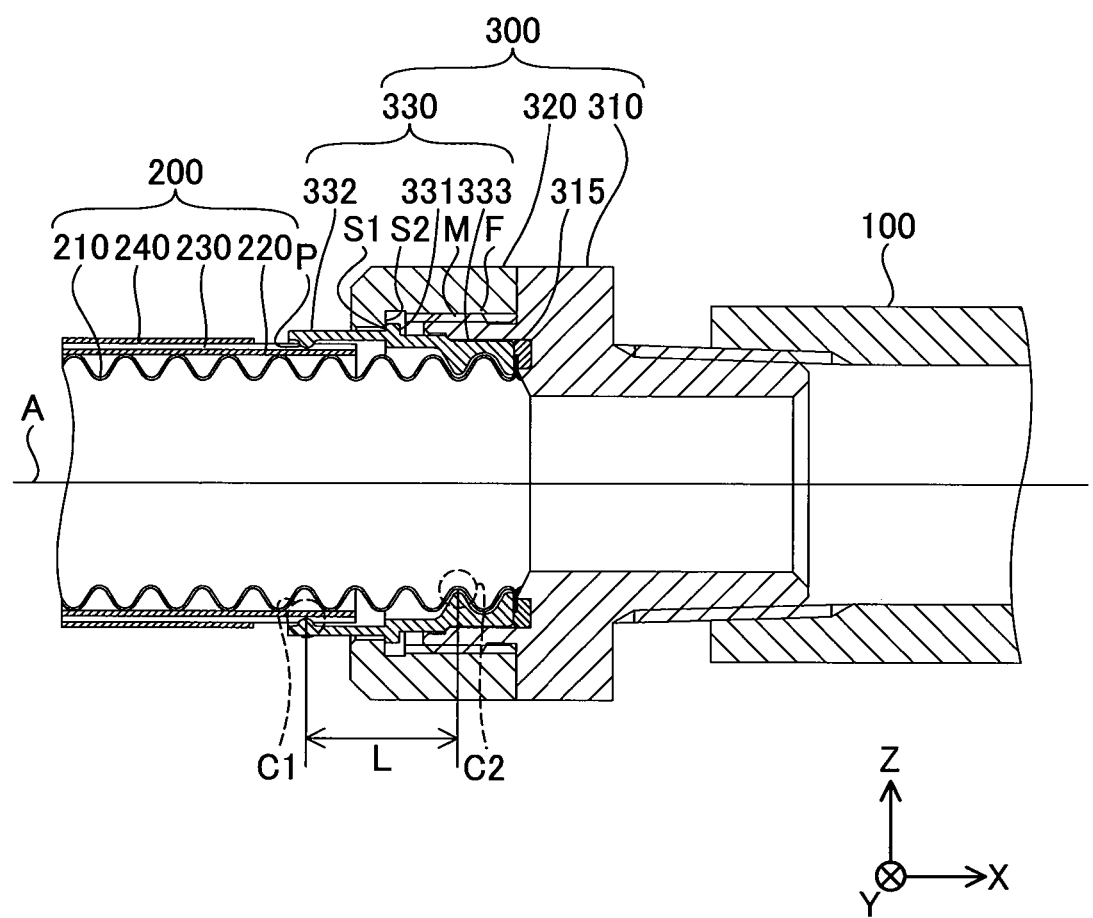
FIG. 2 is a section view of the pipe joint in FIG. 1.

FIG. 2 is a section view of the pipe joint 300 in FIG. 1. FIG. 2 illustrates a section parallel to an XZ plane including the axis line A. The pipe joint 300 connects the first pipe 100 and the second pipe 200. The first pipe 100 is a copper pipe, for example, and is grounded. The second pipe 200 is a so-called corrugated pipe. The second pipe 200 includes a pipe member 210, a resin layer 220, a conductive layer 230, and a resin layer 240.

The pipe member 210 is a corrugated pipe member. The corrugation processing is a process of forming a peripheral surface of the pipe member into a waveform. The pipe member 210 is a pipe member made of metal such as stainless steel, for example. The peripheral surface of the pipe member 210 is formed in a waveform where a part projecting in an outer diameter direction and a part recessed in an inner diameter direction are repeated alternately along the axis line A direction. The corrugated pipe member 210 is excellent in bendability compared to a pipe member having a smooth peripheral surface. The thickness of the pipe member 210 may be determined in accordance with demanded bendability and durability.

The resin layer 220 is a layer made of insulating resin and covers the pipe member 210. The insulating resin used for the resin layer 220 is vinyl chloride. In other configurations, the insulating resin used for the resin layer 220 may be any of polyethylene, fluororesin, natural rubber, and synthetic rubber. The resin layer 220 covers the pipe member 210 except an end portion on the + side of the X-axis direction of the pipe member 210.

The conductive layer 230 is a layer having a lower electric resistance than the metal forming the pipe member 210 and covers the pipe member 210 surrounded by the resin layer 220. The conductive layer 230 covers the entire of the resin layer 220 and thus indirectly covers the pipe member 210. In the example, the conductive layer 230 has a braid structure. The braid structure is a structure formed by combining and braiding wire members. In the example, the wire members forming the braid structure has a structure formed by winding foil-like copper spirally around a surface of resin wire members. In other examples, the braid structure may be a structure formed by braiding copper wire members and resin wire members so that they are arranged alternately or a structure formed by braiding metallic wire members and metallic wire so that they are arranged alternately. The example of metallic wire members includes copper, iron and the like. The pipe joint may be also applied to a pipe including a conductive layer of a different form from the braid structure. The conductive layer of a different form from the braid structure is, for example, a conductive layer made of metallic foil or a conductive layer made of expand metal.

The resin layer 240 is a layer made of insulating resin and covers the conductive layer 230. The resin layer 240 covers the conductive layer 230 except an end portion on the +end side in the X-axis direction of the conductive layer 230.

The second pipe 200 has a function of releasing, through the conductive layer 230, a large current occurred by induction lightning and having entered a building through wires and the like. The large current flowing in the conductive layer 230 needs to be released to a ground.

The pipe joint 300 includes a connection part 310, a housing part 320, and two conductive members 330. The connection part 310, the housing part 320, and the two conductive members 330 are all made of metal having a smaller electric resistance value than the pipe member 210. When the pipe member 210 is made of stainless steel, brass and the like may be used for the connection part 310, the housing part 320, and the two conductive members 330.

The connection part 310 is connected to the first pipe 100. The connection part 310 is connected to the first pipe 100 by engagement between a male screw (not illustrated) formed on the outer peripheral surface on the + side in the X-axis direction of the connection part 310 and a female screw (not illustrated) formed on the inner peripheral surface on the – side in the X-axis direction of the first pipe 100.

The housing part 320 is engaged with the connection part 310. In the example, the housing part 320 is engaged with the connection part 310 along the X-axis direction from the – side in the X-axis direction. The housing part 320 is engaged with the connection part 310 by engagement between a female screw F formed on the inner peripheral surface on the + side in the X-axis direction of the housing part 320 and a male screw M formed on the outer peripheral surface on the – side in the X-axis direction of the connection part 310. Moreover, the second pipe 200 is inserted from the + side in the X-axis direction to the – side in the X-axis direction so that the housing part 320 houses the second pipe 200 therein.

The connection part 310 includes a sealing member 315. The sealing member 315 is arranged on the inside of the connection part 310. The sealing member 315 seals a gap between the pipe member 210 and the connection part 310 when the housing part 320 is engaged with the connection part 310 in the state where the housing part 320 houses the second pipe 200 therein. The sealing member 315 may be a sheet-formed gasket formed by mixing rubber binder made of nitrile butadiene rubber or the like and a filler in at least one of inorganic and organic fibers, and rolling and vulcanizing them.

Figure 3:
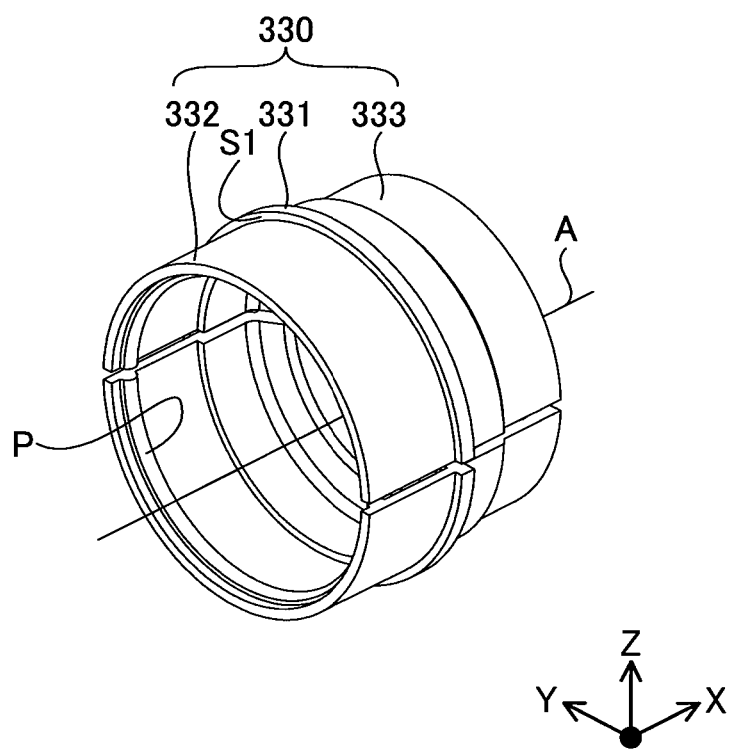
FIG. 3 is a perspective view illustrating a configuration of two conductive members in the first example.

FIG. 3 is a perspective view illustrating a configuration of the two conductive members 330 in the first example. The two conductive members 330 are arranged on the inside of the housing part 320. Both of the two conductive members 330 have a semicircular-shaped section when cut along the YZ plane, and the semicircular shape extends along the X-axis direction. In other words, the two conductive members 330 have a halved cylindrical appearance along the axis line A. The two conductive members 330 are engaged with the pipe member 210 to sandwich the pipe member 210 and face each other in the Z-axis direction, thereby covering the periphery of the pipe member 210.

Figure 4:
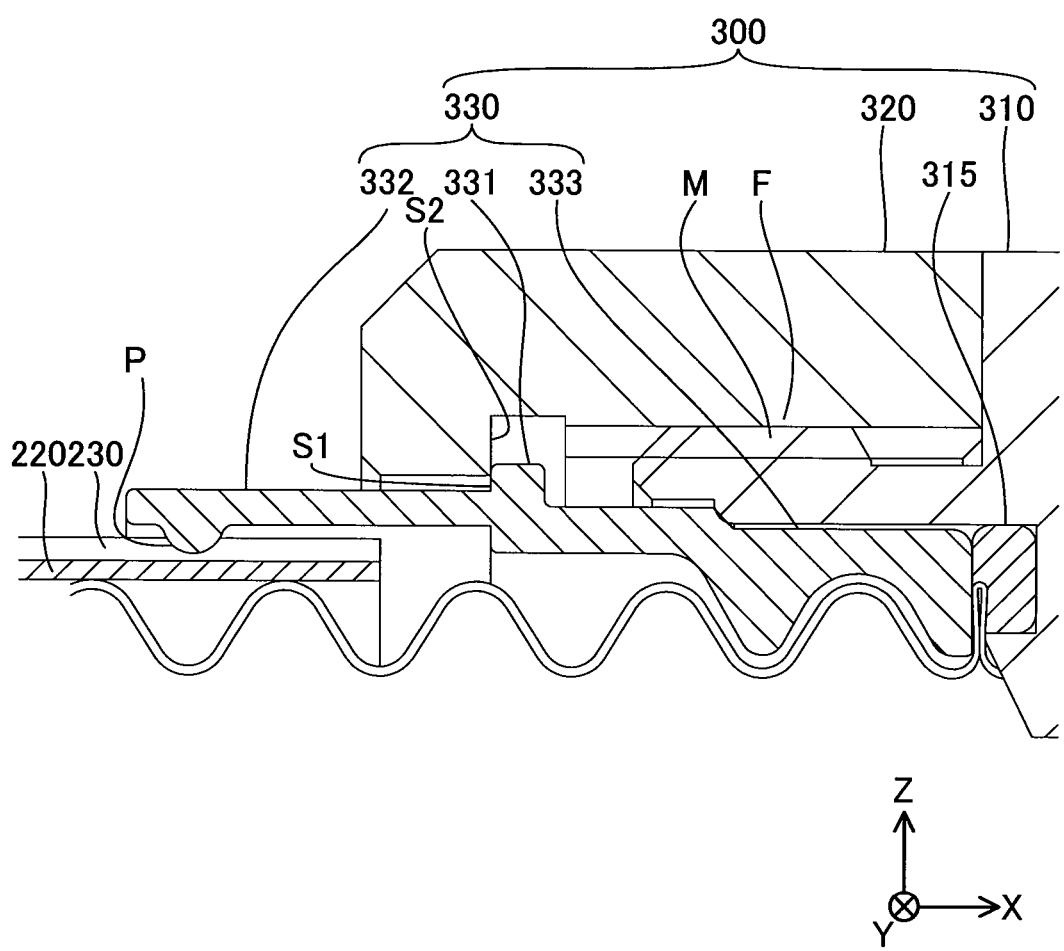
FIG. 4 is an enlarged view enlarging the periphery of the conductive member.

FIG. 4 is an enlarged view enlarging the periphery of the conductive member 330 in the pipe joint 300. The conductive member 330 includes a first part 331, a second part 332, and a third part 333. The first part 331 is in contact at least partially with the housing part 320. In the example, the first part 331 is in contact with an inner portion of the housing part 320. The first part 331 includes a surface S1 facing the – side in the X-axis direction among the X-axis direction parallel to the axis line A of the second pipe 200. The surface S1 facing the – side in the X-axis direction corresponds to a "surface facing one side in the axis direction" in "Solution to Problem." The surface S1 is in contact with a surface S2 facing the + side in the X-axis direction on the inside of the housing 320. The second part 332 is exposed to the outside of the housing 320 to be in contact with the conductive layer 230. The second part 332 includes a projection P projecting toward the conductive layer 230. The third part 333 is engaged with an outer edge of the pipe member 210 in the second pipe 200 arranged in the housing 320. To allow the drawing to be understood easily, the third part 333 is separated from the pipe member 210 in the drawing. However, it is supposed that the third part 333 is engaged with the outer edge of the pipe member 210.

Figure 5:
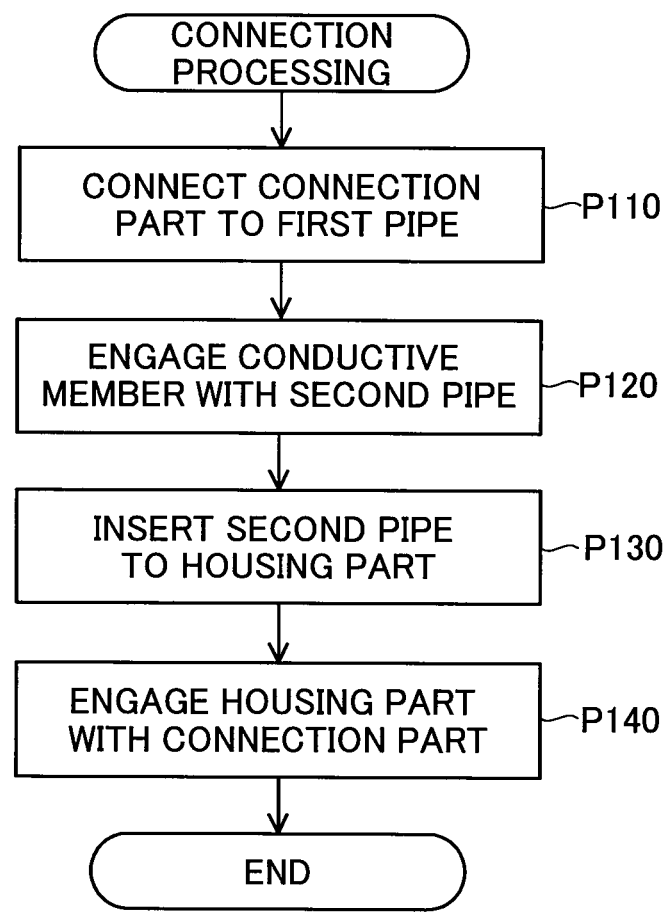
FIG. 5 is a flowchart illustrating connection processing.

A2. Connection Processing:

FIG. 5 is a flow chart illustrating the operation procedures of connection processing in which the pipe joint 300 connects the first pipe 100 and the second pipe 200. It is supposed that at the start of the connection processing, the pipe joint 300 is disassembled, and the connection part 310, the housing part 320, and the two conductive members 330 are prepared as separate parts.

Once the connection processing is started, an operator first connects the connection part 310 to the first pipe 100 (Step P110). After the connection part 310 is connected to the first pipe 100 (Step P110), the operator engages the two conductive members 330 with the second pipe 200 (Step P120). The two conductive members 330 are engaged with the second pipe 200 by engagement between the third part 333 and the outer edge of the end portion on the + side in the X-axis direction of the pipe member 210.

After the two conductive members 330 are engaged with the second pipe 200 (Step P120), the operator inserts the second pipe 200 to the housing part 320 (Step P130). The second pipe 200 is inserted to the housing part 320 toward − side in the X-axis direction. The two conductive members 330 are engaged with the outer edge of the second pipe 200 to be inserted to the housing part 320. The second pipe 200 is inserted to the housing part 320 toward the − side in the X-axis direction until a point where the surface S1 in the two conductive members 330 is brought into contact with the surface S2 on the inside of the housing part 320.

After the second pipe 200 is inserted to the housing part 320 (Step P130), the operator engages the housing part 320 with the connection part 310 (Step P140). The housing part 320 is engaged with the connection part 310 from the − side in the X-axis direction in the state where the two conductive members 330 are engaged with the outer edge of the second pipe 200 housed in the housing part 320 by their third parts 333. As the female screw F formed in the housing part 320 is screwed into the male screw M formed in the connection part 310, the housing part 320 presses the third part 333 of the conductive member 330 against the pipe member 210. In this manner, the housing part 320 is engaged with the connection part 310, thereby fixing the second pipe 200 via the conductive member 330. Once the Step P140 is completed, the connection processing is finished.

The following will describe the contact state between the first part 331 and the second part 332 with reference to FIG. 4. When the pipe joint 300 connects the first pipe 100 and the second pipe 200, the surface S1 of the first part 331 is in contact with the surface S2 on the inside of the housing part 320. In the connection processing, the housing part 320 is engaged with the connection part 310 from the − side in the X-axis direction in the state where the housing part 320 houses therein the second pipe 200 having the outer edge with which the two conductive members 330 are engaged. Thus, the housing part 320 is engaged with the connection part 310 in the state where the surface S2 presses the surface S1 toward the + side in the X-axis direction.

When the pipe joint 300 connects the first pipe 100 and the second pipe joint 200, the second part 332 is exposed to the outside of the housing part 320 to be in contact with the conductive layer 230. Moreover, the projection P of the second part 332 is pressed against the conductive layer 230. In the conductive member 330, the projection P is designed to be pressed against the conductive layer 230 in the state where the third part 333 is engaged with the outer edge of the pipe member 210.

A3. Ground Path:

The following will describe a ground path for releasing a large current occurred by induction lightning to a ground. When a large current occurred by induction lightning and having entered a building through wires flows in the second pipe 200, the large current flows to the conductive layer 230 that is a layer having lower electric resistance than the metal forming the pipe member 210. The large current having flowed in the conductive layer 230 is transmitted to the housing part 320 through the second part 332 with the projection P and the first part 331, and then flows into the grounded first pipe 100 through the connection part 310 engaged with the housing part 320. In the example, the pipe joint 300 is in contact with the conductive layer 230 of the second pipe 200 by the second part 332 exposed to the outside. Therefore, compared to the form in which the conductive layer is in contact with the pipe joint on the inside of the pipe joint, it is possible to extend the length of the pipe member 210 on the + side in the X-axis direction from the contact point between the conductive layer 230 and the conductive member 330. In this manner, the electric resistance between the contact point and the exposed pipe member 210 on the + side in the X-axis direction is larger and, thus, it is possible to reduce the risk that the pipe member 210 is selected as the path of a large current, instead of the pipe joint 300 (conductive member 330).

A4. Effects:

In the pipe joint 300 of the first example described above, the pipe joint 300 is in contact with the conductive layer 230 of the second pipe 200 by the second part 332 exposed to the outside. Thus, it is possible to confirm from the outside whether the conductive layer 230 is in contact with the pipe joint 300 after the second pipe 200 is connected to the pipe joint 300. Moreover, compared to the form in which the conductive layer is in contact with the pipe joint on the inside of the pipe joint, it is possible to more easily secure a contact area between the conductive layer 230 and the pipe joint 300, which allows a large current to flow more easily from the conductive layer 230 to the pipe joint 300. To be more specific, in the form where the conductive layer is in contact with the pipe joint on the inside of the pipe joint, space in which the conductive member on the pipe joint side to be in contact with the conductive layer is arranged is inside the pipe joint. Thus, the size of the space is limited, which makes it difficult to secure the contact area between the conductive layer and the pipe joint (conductive member). However, in the pipe joint 300 of the first example, the conductive layer 230 is in contact with the pipe joint 300 on the outside of the pipe joint 300, and thus it is easy to sufficiently secure the contact area between the conductive layer 230 and the pipe joint 300 (conductive member 330). It is possible to easily let a large current flow from the conductive layer 230 to the housing part 320 because the larger contact area allows a larger current to flow on the contact surface. Therefore, it is possible to easily release the large current occurred by induction lightning to the grounded first pipe 100.

At the part where the conductive layer 230 is in contact with the second part 332, a flow of a large current easily burns the conductive layer 230 or the second part 332 down.

However, in the pipe joint 300 of the first example, it is possible to easily secure a sufficient contact area between the conductive layer 230 and the second part 332. Thus, it is possible to more securely allow the contact between the conductive layer 230 and the second part 332 with a sufficient contact area. Therefore, even if a large current flows a plurality of times, the contact between the conductive layer 230 and the second part 332 is hardly burned down.

Moreover, in the pipe joint 300 of the first example, the second part 332 includes the projection P projecting toward the conductive layer 230. Thus, the contact between the second part 332 and the conductive layer 230 is secured easily. When the part of the projection P of the second part 332 is a plane surface parallel to the XY plane, there is a risk that the contact between the second part 332 and the conductive layer 230 is not secured due to size errors in the production of the parts forming the pipe joint 300. However, when the second part 332 has a shape projecting toward the conductive layer 230 such as the projection P of the second part 332 in the first example, the contact between the second part 332 and the conductive layer 230 is easily secured even with size errors in the production.

Moreover, in the pipe joint 300 of the first example, the housing part 320 is engaged with the connection part 310 in the state where the housing part 320 presses the surface S1 facing the − side in the X-axis direction of the first part 331 from the + side in the X-axis direction, which makes it difficult to deteriorate the contact between the housing part 320 and the conductive member 330.

Moreover, in the pipe joint 300 of the first example, it is possible to extend the distance L (illustrated in FIG. 2) between the contact point C1 of the conductive layer 230 and the pipe joint 300 and the contact point C2 of the pipe member 210 and the pipe joint 300 compared to the form in which the conductive layer is in contact with the pipe joint on the inside of the pipe joint. The extension of the distance L indicates that the contact point C1 is provided on the more upstream side (− side in the X-axis direction in the description of the first example) of a large current occurred by induction lightning. If the contact point C1 is provided on the upstream side, the distance between the contact point C1 and the contact point C2 is longer, and the electric resistance of the pipe member 210 is larger therebetween, which makes it difficult that the current flows to the pipe member 210. Therefore, it is possible to let a large current occurred by induction lightning and having flowed in the conductive layer 230 to the contact point C1 flow to the conductive member 330 side where a current flows more easily. This prevents a flow of a large current to the pipe member 210 positioned between the contact point C1 and the contact point C2. Therefore, it is possible to suppress damage of the pipe member 210 by transmission of a large current occurred by induction lightning.

B. Other Examples

In the pipe joint 300 of the first example, the conductive member 330 includes the third part 333. However, this disclosure is not limited thereto. For example, the conductive member 330 may not include the third part 333, and may include only the first part 331 and the second part 332. In such a pipe joint 300, the housing part 320 may fix the second pipe 200 via the first part 331 and the second part 332.

In the pipe joint 300 of the first example, the second part 332 includes the projection P projecting toward the conductive layer 230. However, this disclosure is not limited thereto. For example, the second part 332 may have a plane surface parallel to the XY plane, and may be in contact with the conductive layer 230 by such a surface.

The pipe joint 300 of the first example connects the second pipe 200 including the pipe member 210, the resin layer 220, the conductive layer 230, and the resin layer 240 to the first pipe 100. However, this disclosure is not limited thereto. For example, the pipe joint 300 may connect a pipe not including the resin layer 240 as the outermost layer to the first pipe 100.

In the pipe joint 300 of the first example, the pipe joint 300 connects the first pipe 100 and the second pipe 200 by the connection processing illustrated in FIG. 5. However, this disclosure is not limited thereto. For example, the pipe joint 300 may connect the first pipe 100 and the second pipe 200 by the connection processing illustrated in FIG. 6.

Figure 6:
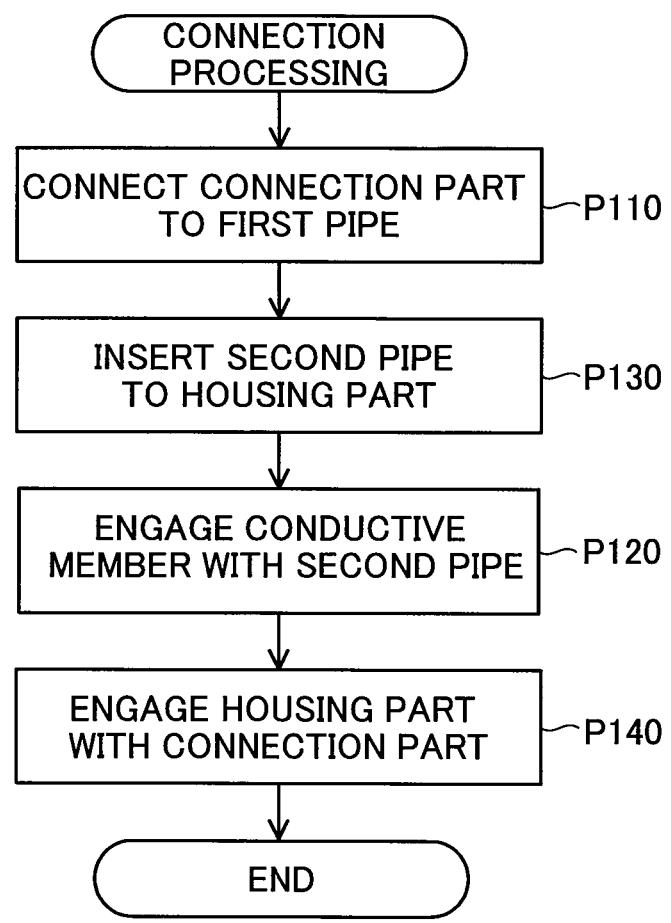
FIG. 6 is a flowchart illustrating connection processing.

FIG. 6 is a flowchart illustrating operation procedures of connection processing different from the connection processing illustrated in FIG. 5. The connection processing illustrated in FIG. 6 is same as the connection processing illustrated in FIG. 5 except the aspect that the order of the step P120 and the step P130 is reversed.

Figure 7:
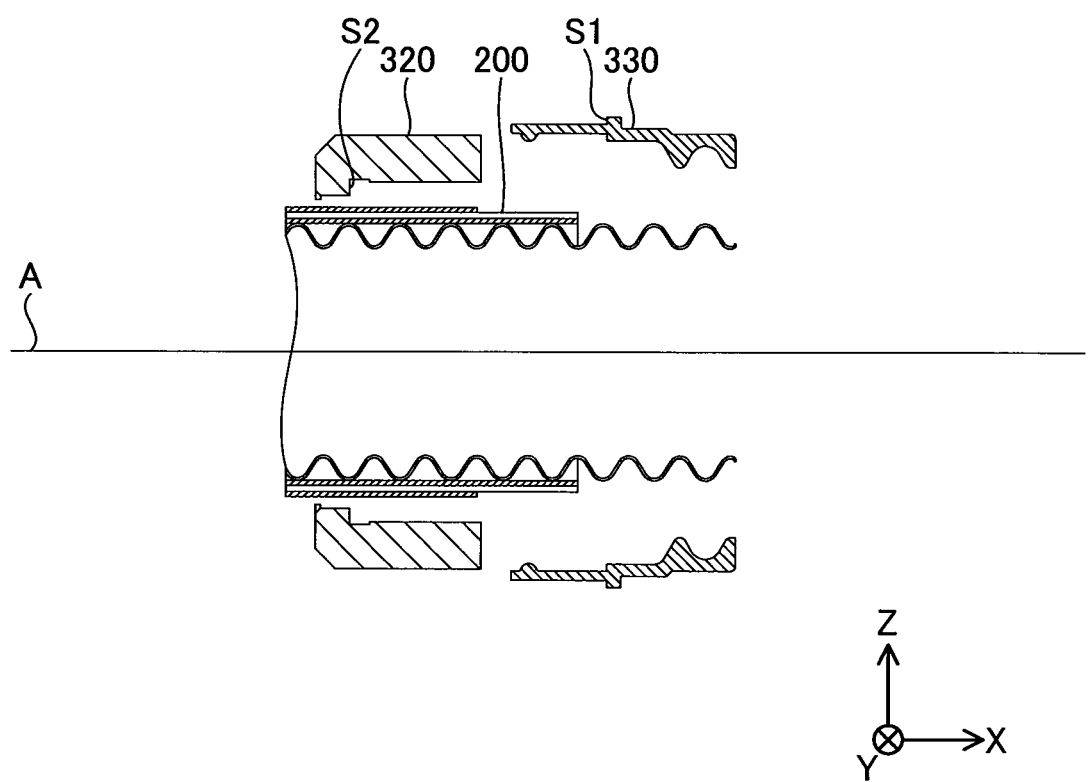
FIG. 7 is an explanatory diagram illustrating a state where one step of the connection processing is being performed.

FIG. 7 is an explanatory diagram illustrating the state where the step P120 is performed after the step P130 in the connection processing illustrated in FIG. 6. In the connection processing illustrated in FIG. 6, the connection part 310 is connected to the first pipe (Step P110), and then an operator inserts the second pipe 200 to the housing part 320 (Step P130). The second pipe 200 is inserted to the housing part 320 toward the + side in the X-axis direction. The two conductive members 330 are not engaged on the outer side of the second pipe 200 to be inserted to the housing part 320. After the second pipe 200 is inserted to the housing part 320 (Step P130), the operator engages the two conductive members 330 with the second pipe 200 (Step P120). After the two conductive members 330 are engaged with the second pipe 200 (Step P120), the operator engages the housing part 320 with the connection part 310 (Step P140). Also, when the pipe joint 300 connects the first pipe 100 and the second pipe 200 by the connection processing illustrated in FIG. 6, the housing part 320 is engaged with the connection part 310 in the state where the surface S2 presses against the surface S1 toward the + side in the X-axis direction.

Our pipe joints are not limited to the above-described examples and modifications, and may be achieved with various configurations without departing from the scope of this disclosure. For example, the technical features in the examples and modifications corresponding to the technical features of each aspect in the summary may be appropriately replaced or combined to address a part or all of the above-described problems or to achieve a part or all of the above-described effects. Moreover, if the technical features are not explained as necessary in the specification, they may be deleted appropriately.

What is claimed is:
1. A pipe joint connecting a first pipe having conductivity and being grounded and a second pipe including a corrugated metallic pipe member and a conductive layer having lower electric resistance than metal forming the pipe member and covering the pipe member, the pipe joint comprising:
  a connection part having conductivity and connected to the first pipe;
  a housing part having conductivity, engaged with the connection part, and housing the second pipe inside the housing part by insertion of the second pipe along an axis direction of the second pipe; and a conductive member that includes a first part in contact with an inner portion of the housing part and a second part exposed to an outside of the pipe joint and being in contact with the conductive layer, wherein the second part is in contact with the conductive layer by a projection projecting toward the conductive layer, the conductive member includes a third part configured to be engaged with an outer edge of the pipe member of the second pipe in the housing part, and the conductive member includes a part between the second part and the third part, wherein the part faces the second pipe and does not contact the second pipe.

2. The pipe joint according to claim 1, wherein the first part includes a surface facing at least one side of the axis direction, and the housing part is engaged with the connection part from the one side and fixes the second pipe through the conductive member, in a state that the third part is engaged with the outer edge of the second pipe.

* * * * *